United States Patent Office 3,194,834
Patented July 13, 1965

3,194,834
PROCESS OF OXIDATION OF ORGANOBORANES
John K. Presswood, Baton Rouge, La., assignor to Ethyl Corporation, New York, N.Y., a corporation of Virginia
No Drawing. Filed Dec. 20, 1961, Ser. No. 160,899
8 Claims. (Cl. 260—540)

This invention relates to the provision of novel methods for the preparation of alcohols, aldehydes, ketones, organic acids, and esters.

The controlled oxidation of trialkylboranes was investigated more than one hundred years ago by Frankland and Duppa (Proc. Roy. Soc. (London) 10, 568, 1859; 12, 123, 1863; Ann. 115, 319, 1860; J. Chem. Soc. 15, 363, 1862) and the reaction has been the subject of extensive investigation since that time. Mixed oxidation products were usually reported but in no case did the oxidation go beyond the trialkylborate stage. Oxidation beyond this stage has now been achieved with the resultant formation of alcohols, aldehydes, ketones, organic acids, and/or esters.

Accordingly, it is an object of the present invention to provide a novel method for the preparation of alcohols, aldehydes, ketones, organic acids, or esters or of mixtures of two or more of the above types of compounds. Another object is to provide a novel method for the oxidation of trialkylborane compounds to an oxidation stage beyond that corresponding to the trialkylborates. Still another object is to provide a novel method of oxidation of trialkylborane compounds to an oxidation stage beyond that corresponding to the trialkylborates by the use of oxygen or air as the oxidizing agent. Still other objects will appear hereinafter.

In accordance with the present invention it has been found that when an organoborane is subjected to oxidation by means of an oxidizing agent composed of gaseous oxygen or mixtures thereof with inert gaseous diluents using a particular type of aluminum compound as the catalyst, an oxidation product is obtained which consists essentially of one or more alcohols, aldehydes, ketones, organic acids, or esters, or of mixtures of compounds representative of two or more of these compound types.

An outstanding advantage of the process of this invention is that it permits the complete oxidation of organoboron compounds and thereby enables the conversion of all the organic substituents to useful oxygenated products.

The organoborane reactants used in this process are preferably triorganoboranes having the formula $R_3B$ wherein R is an alkyl, cycloalkyl, aralkyl, aryl, or alkaryl radical, and wherein the several R groups may be the same or different. If desired, effective use may be made of the corresponding organoboron hydrides which frequently exist in dimeric form, an example being diamylboron hydride. Generally speaking, each of the R radicals in the foregoing formula contains up to about 18 carbon atoms. Of the triorganoboranes useable in the process of this invention it is preferable to employ the alkyl boranes, especially the trialkylboranes in which each of the alkyl groups contains from 2 to about 18 carbon atoms because such compounds can be readily prepared in high yield by the simple procedures described for example in J. Org. Chem. 22, 1136, 1137 (1957). Accordingly, illustrative organoboron compounds useful in the process of the invention include: triethylborane, tris(n-pentyl) borane, tris(2-ethylhexyl) borane, tris(n-decyl) borane, diethyldecyl borane, tris(n-hexadecyl) borane, tris(methylcyclopentyl) borane, tris(p-tolyl) borane, diphenyl-p-tolyl borane, triacenaphthyl borane, trianthryl borane, di-n-butylanthryl borane, tri-o-cumenyl borane, tris(2-methylbenzyl) borane, trimesityl borane, and phenyldimesityl borane.

The oxidant employed in the process of this invention is a gaseous agent. This agent may be pure oxygen; air; oxygen diluted with such inert gaseous components as nitrogen, saturated hydrocarbons, helium, neon, argon, krypton, or xenon; or mixtures of these oxygen-containing systems. Generally speaking, it is preferable to use essentially pure oxygen or air because of their availability.

The catalyst employed in the process of this invention has the formula $AlY_3$ wherein each Y group is individually selected from the group consisting of halide, alkoxy, cycloalkoxy, aralkoxy, aryloxy, and alkaryloxy radicals. The carbon-containing Y groups each preferably contains from one to about 18 carbon atoms. Consequently the catalysts which are charged to the reaction system in accordance with this invention initially consist essentially of such compounds as aluminum chloride, aluminum bromide, aluminum dichlorobromide, aluminum triethoxide, aluminum tributoxide, aluminum tricyclohexoxide, aluminum triphenoxide, aluminum triscumenyloxide, aluminum tribenzyloxide, diethoxy aluminum chloride, diisooctyloxy aluminum bromode, diphenoxy aluminum chloride, phenoxy aluminum dichloride, and the like. From a cost effectiveness standpoint it is desirable to use those aluminum compounds in which all Y groups are alike since these compounds are generally easiest to prepare. Particularly efficacious results have been achieved through the use of aluminum trialkoxides, especially those in which the alkoxy groups are the same and each contains up to about 6 carbon atoms. Accordingly, these compounds are particularly preferred for use in accordance with this invention.

A particularly preferred embodiment of the present invention is the oxidation of a lower trialkylborane with essentially pure oxygen in the presence of an aluminum ethoxide catalyst. Another particularly preferred embodiment is the oxidation of tri-n-hexyl borane with essentially pure oxygen at elevated temperature and pressure, and in the initial presence of a small amount of aluminum ethoxide as catalyst. These reactants are readily prepared and require no elaborate precautions in handling except for the exclusion of moisture and the avoidance of premature oxidation.

The conditions under which the reaction of this invention is carried out may vary over a rather wide range. In general, the nature and composition of the reaction product obtained are determined quite largely by the ratio of the reactants employed. Thus the use of stoichiometric proportions of organoboron compound and oxidant or the use of a deficiency of oxidant tends to favor the formation of alcohols, whereas the use of an excess of oxidant favors the formation of more highly oxidized products such as aldehydes, ketones, acids, and esters, the proportion of acids in the product increasing with the excess of oxidant.

The reactions of this invention can be and usually are carried out in the absence of any solvent. However, when a product high in alcohol content is desired, mild oxidizing conditions are used. These conditions are best obtained through the use of a solvent because the latter effectively reduces the concentration of oxidant and, through reflux, prevents the occurrence of excessive operating temperatures. Any organic solvents which are inert to the reactants and products can be used and, if they have boiling points within the range of stability of the reactants and products, the reflux technique may be employed to maintain constancy of temperature. These solvents should be completely anhydrous in order to avoid decomposition of the borane reactant and the catalyst. The low-boiling hydrocarbons and ethers (e.g., those boiling within the range of about 50 to about 150° C.) are particularly suitable solvents for the preparation of alcohols by the reaction of this invention. The aromatic hydrocarbons are preferred inasmuch as they are somewhat better solvents for the reactants than are the aliphatic compounds. Examples of suitable solvents include benzene, toluene, the xylenes, 2,2,5-trimethylhexane, di-n-butyl ether, anisol, tetrahydrofuran, and the like.

The invention will be more fully understood by reference to the following set of illustrative examples in which all parts and percentages are by weight.

*Example I*

An autoclave was charged in a dry box with 10 parts of tri-n-hexylborane and 1 part of aluminum ethoxide. The autoclave was sealed and pure oxygen was charged to a pressure of 200 pounds per square inch gauge. The autoclave was heated to 145° C. and was charged with additional oxygen to a pressure of 875 p.s.i.g. The above temperature was maintained for a period of 16 hours during which the pressure fell to 600 p.s.i.g. After cooling, the autoclave was vented and then opened. The product, which smelled strongly of caproic acid, was extracted with chloroform to separate the organic material. Analysis of the solution by vapor phase chromatography indicated the absence of hexyl alcohol. Infrared analysis showed the presence of 5.005 parts of caproic acid; this corresponded to a yield of 38.4 percent. The presence in the product of hexaldehyde was indicated by vapor phase chromatography.

*Example II*

The initial procedure was the same as in Example I. After the autoclave reached a temperature of 145° C. it was found that the pressure had dropped to 100 p.s.i.g. and the autoclave was recharged three times at 45-minute intervals to 200 p.s.i.g. with oxygen. After a total feeding period of about 3.5 hours, the heat was cut off and 17 hours thereafter the autoclave was vented and opened. The product was dissolved in chloroform, hydrolyzed, and analyzed by vapor phase chromatography; the content of hexyl alcohol was 7.6 percent. Infrared analysis of the product indicated a yield of 36.5 percent of caproic acid.

*Example III*

An autoclave was charged with 10 parts of tri-n-hexyl borane, 1 part of aluminum ethoxide and 30 parts of benzene. Oxygen was charged to 50 p.s.i.g. and the autoclave, after heating to 143° C., was further charged to 100 p.s.i.g. The heat was cut off after 5.5 hours. After venting, the products were washed into a separatory funnel with 10 percent aqueous sodium hydroxide and chloroform. After acidification, the chloroform layer was filtered and analyzed by vapor phase chromatography, the hexanol yield being found to be 61 percent. Infrared analysis of the product indicated the virtual absence of carbonyl species.

*Example IV*

An autoclave was charged with 10 parts of tri-n-hexyl borane and 1 part of aluminum chloride, followed by 25 p.s.i.g. of oxygen, and was heated to 108° C., after which the oxygen pressure was raised to 50 p.s.i.g. After 20 hours, the autoclave was cooled and vented. The product, extracted with chloroform and hydrolyzed, contained hexanol corresponding to a yield of 35 percent, according to vapor phase chromatographic analysis.

*Example V*

100 parts of dry benzene, 20 parts of tri-n-hexyl borane and 2 parts of aluminum ethoxide were charged to a round-bottom flask. When oxygen was bubbled into the stirred solution, the temperature rose rapidly. The passage of oxygen was continued for nine hours at 70–80° C. Chloroform extraction and hydrolysis of the product, followed by vapor phase chromatographic analysis, indicated a hexanol yield of 55 percent.

*Example VI*

When 10 parts of tri-n-hexyl borane and 1 part of aluminum ethoxide in 27 parts of benzene were reacted with oxygen under a pressure of 8 atmospheres and at a temperature of 150° C. for 12 hours, 61 percent of n-hexyl alcohol was obtained on hydrolysis, together with a 5 percent yield of carbonyl species, the latter consisting largely of n-hexyl aldehyde.

*Example VII*

7 parts of triisobutyl borane, 21 parts of benzene and 1 part of aluminum isobutoxide are charged to a round-bottom flask. Oxygen under atmospheric pressure is bubbled through the solution at a temperature of 70–80° for 22 hours. The hydrolysis product is isobutyl alcohol and there is little or no formation of carbonyl species.

*Example VIII*

Trioctylborane (13 parts) and aluminum propoxide (1.5 parts) are introduced into an autoclave which is then sealed and charged with air at a pressure of 68 atmospheres. The autoclave is heated to 120° C. and maintained at that temperature for 18 hours. Caprylic acid is obtained in high yield.

*Example IX*

When 20 parts of tridodecyl borane and 2 parts of aluminum ethoxide are pressurized in an autoclave to a pressure of 30 atmospheres with an oxidant consisting of oxygen, 10 percent, methane, 30 percent, and nitrogen, 60 percent, and the autoclave and contents are heated to 195° C. for 8 hours, an excellent yield of dodecyl alcohol is obtained upon hydrolysis, which contains very small proportions of carbonyl species.

*Example X*

30 parts of trioctadecylborane and 2 parts of aluminum ethoxide are treated in a sealed autoclave with oxygen under a pressure of 55 atmospheres and the autoclave is heated to 135° C. and maintained at this temperature for 20 hours. A high yield of relatively pure stearic acid is obtained.

*Example XI*

Triphenylborane and aluminum isobutoxide are combined in the ratio 9:1 in an autoclave which is then sealed. Air is introduced under a pressure of 5 atmospheres. The autoclave is heated to 210° C. and maintained at this temperature for a period of 16 hours. Hydrolysis of the products gives a large yield of phenol contaminated with minute amounts of carbonyl species, principally benzaldehyde.

*Example XII*

A solution of 13 parts of tris(2,4-xylyl) borane in 39 parts of benzene is treated in a round-bottom flask with 1½ parts of aluminum propoxide. A mixture of oxygen and nitrogen containing 40 percent of the former is bubbled through the solution at a pressure of 1 atmosphere and a temperature of 70–80° C. for a period of 20 hours. Upon hydrolysis, a high yield of nearly pure 2,4-xylenol is obtained.

*Example XIII*

1 part of aluminum ethoxide is added to 11 parts of tri-o-tolyl borane in an autoclave which is then sealed and pressurized with 40 atmospheres of oxygen. The autoclave is heated for 15 hours at a temperature of 155° C. The product, nearly pure benzoic acid, is obtained in high yield.

*Example XIV*

A mixture of tricyclohexylborane (10 parts) and aluminum ethoxide (1 part) is pressured with 50 pounds of air in a sealed autoclave. After the autoclave and contents have been heated to a temperature of 230° C. for a period of 5 hours, workup of the product gives a mixture of carbonyl species, principally cyclohexanoic acid, in high yield.

Example XV

When 12 parts of tris(methylcyclohexyl) borane and 1 part of aluminum isobutoxide are treated in a sealed autoclave with a gaseous mixture of 40 percent of oxygen and 60 percent of helium at a pressure of 15 atmospheres and at a temperature of 170° C. for a period of 11 hours and the reaction product is hydrolyzed, a high yield of methylcyclohexanol is obtained, accompanied by small amounts of various carbonyl species, principally methylcyclohexanal.

Example XVI

Tribenzylborane (11 parts) and aluminum ethoxide (1 part) are reacted in an autoclave with air under 60 atmospheres' pressure and at a temperature of 165° C. for a period of 12 hours. The product, benzoic acid, is obtained in high yield.

Example XVII

A mixture of triphenethylborane (13 parts) and aluminum ethoxide (1.5 parts) is treated in an autoclave with a gaseous mixture consisting of 40 percent oxygen, 10 percent argon, and 50 percent nitrogen under a pressure of 35 atmospheres. The autoclave is heated to 145° C. and the temperature maintained at that point for 19 hours. After cooling, the reaction product is hydrolyzed. A mixture of phenethyl alcohol and various carbonyl species is obtained.

Example XVIII

Tri-α-naphthyl borane (15 parts) is dissolved in benzene (45 parts) in a round-bottom flask, and 2 parts of aluminum propoxide are added to the mixture. Air under atmospheric pressure is bubbled through the mixture at a temperature of 70 to 80° for 24 hours to produce, upon hydrolysis, α-naphthol in good yield accompanied by trace amounts of carbonyl species.

In carrying out the reactions of this invention the ratio of the reactants can be varied within wide limits, namely, from a ten-fold or greater excess of the oxidant to a deficiency thereof as compared with the amount called for by the stoichiometry of the reaction. Ratios varying from stoichiometric to a 100 percent excess of the oxidant have been found to give satisfactory reaction rates and are, therefore, preferred. The amount of catalyst also can be varied from less than 5 percent to more than 20 percent by weight based on the borane used, amounts in the range of 5–10 percent being preferred since their use permits satisfactory reaction rates at moderate temperatures.

The oxidant employed in the reaction is gaseous oxygen either in the pure state or admixed with inert diluents. Such diluents include nitrogen, the lower saturated aliphatic hydrocarbons such as methane, ethane, and the like, and the noble or inert gases helium, neon, argon, krypton, and xenon. These diluents may consist of single species or mixtures of any two or more of the above-named species in any desired proportions, subject of course to the requirement that the amount of oxygen present be sufficient to carry out the desired oxidation. A wide variety of reaction temperatures can be employed, ranging from 100 to 250° C. or above. The generally useful temperatures range from about 125 to 175° C. and, accordingly, these temperatures are preferred. The oxidant pressure employed for those reactions carried out in low-boiling solvents is suitably atmospheric for ease in manipulation and simplicity in equipment. However, pressures above atmospheric can be used if temperatures above the normal reflux temperature of the solvent are desired. For the autoclave reactions, a wide variety of pressures is available, namely, from 100 to 1000 p.s.i.g. or above. Pressures of 200 to 600 p.s.i.g. are most useful and, accordingly, these are preferred.

The reaction period can range from less than 1 hour to more than 1 day depending upon the reaction temperature and the nature of the reactants. Generally speaking, an increase in the complexity of the substituents attached to the boron atom of the borane requires an increase in reaction time, both because of the lowered intrinsic reaction rate associated with the increased complexity and because of the lower temperature required to avoid excessive decomposition of the borane component. Accordingly, reaction periods varying from three hours or less to 24 hours or more may be used, the reaction periods in general increasing as the reaction temperature is decreased and conversely.

As mentioned above, hitherto known methods of oxidation of trialkyl boranes were not effective in carrying the oxidation beyond the trialkylborate stage. By means of the process of the present invention the borane is completely oxidized to boric acid with the splitting of all boron-carbon bonds and the recovery of all the organic components of the borane as separate and distinct species. This accomplishment represents a significant and valuable advance in the art.

The principles developed herein with respect to the oxidation of trialkylboranes also extend and apply to the use as starting materials of the corresponding organic borate esters. That this minor variation can be effectively made without departing from the spirit and scope of this invention is self-evident by reference to specific examples described herein, inasmuch as the oxidations described in these examples are deemed to proceed through the formation of the corresponding organoborate esters as transitory intermediates in the overall reaction sequences. Therefore, effective use can be made of such borate esters as triethyl borate, triphenyl borate, trimesityl borate, tribenzyl borate and tris(methylcyclopentadienyl) borate as initial reactants for use in the present process.

Having thus described the process of this invention it is not intended that it be limited except as set forth in the following claims.

I claim:

1. A process for the preparation of at least one member of the group consisting of alcohols, aldehydes, and organic acids which comprises the oxidation of an organoborane, each organic radical of which contains up to about 18 carbon atoms and is selected from the group consisting of alkyl, aryl, cycloalkyl, alkaryl and aralkyl radicals, with an agent selected from the group consisting of gaseous oxygen and mixtures thereof with inert gaseous diluents, using as a catalyst material for said oxidation a compound selected from the group initially consisting essentially of alkoxides and halides of aluminum, said oxidation being carried out at a temperature in the range of from about 50° to about 210° C. and at a pressure in the range of from about atmospheric to about 1000 p.s.i.g.

2. The process of claim 1 where the organoborane is an alkylborane.

3. The process of claim 1 wherein the catalyst initially consists essentially of an alkoxide of aluminum in which the alkoxy groups are identical and in which each alkoxy group contains from 1 to about 6 carbon atoms.

4. The process of claim 1 wherein the organoborane reactant is a trialkylborane in which each alkyl group contains from 2 to about 18 carbon atoms.

5. The process of claim 1 wherein the organoborane reactant is a trialkylborane in which each alkyl group contains from 2 to about 18 carbon atoms, and wherein the catalyst initially consists essentially of an alkoxide of aluminum in which the alkoxy groups are identical and in which each alkoxy group contains from 1 to about 6 carbon atoms.

6. A process for the preparation of caproic acid which comprises the oxidation of tri-n-hexyl borane with gaseous oxygen, using as a catalyst material for said oxidation a compound initially consisting essentially of aluminum ethoxide, said oxidation being carried out at a temperature in the range of from about 100° to about 250° C. and at a pressure in the range of from about 100 to about 1000 p.s.i.g.

7. A process for the preparation of caproic acid which comprises the oxidation of tri-n-hexyl borane with gaseous oxygen at a pressure of 200 to 600 p.s.i.g. and at a temperature of 50–250° C., using as a catalyst material for said oxidation a compound initially consisting essentially of aluminum ethoxide, said aluminum ethoxide being present initially in a concentration of from 5 to 20 weight percent based on the amount of tri-n-hexyl borane initially present.

8. A process for oxidizing a trialkylborane wherein each alkyl group contains from 2 to about 18 carbon atoms with an agent selected from the group consisting of oxygen and mixtures thereof with inert gaseous diluents, in the presence of a catalyst initially consisting essentially of an alkoxide of aluminum in which the alkoxy groups are identical and each alkoxy group contains from 1 to about 6 carbon atoms, the oxidation being conducted in an inert solvent selected from the group consisting of ethers and aromatic hydrocarbons boiling, at atmospheric pressure, within the range of from about 50° to about 150° C., and conducted at a temperature in the range of from about 50° to about 210° C. and at a pressure of from about 15 to about 600 p.s.i.g., such that the solvent remains in the liquid state.

References Cited by the Examiner
UNITED STATES PATENTS
3,061,626  10/62  Pearson _____ 260—631 X LORRAINE A. WEINBERGER, *Primary Examiner.*
LEON ZITVER, *Examiner.*